(12) United States Patent
Hirao et al.

(10) Patent No.: US 9,950,456 B2
(45) Date of Patent: Apr. 24, 2018

(54) HOUSING AND METHOD OF FORMING THE SAME

(71) Applicant: Kabushiki Kaisha Toshiba, Minato-ku, Tokyo (JP)

(72) Inventors: Hiroaki Hirao, Ome Tokyo (JP); Kazuo Ito, Mitaka Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 16 days.

(21) Appl. No.: 15/016,054

(22) Filed: Feb. 4, 2016

(65) Prior Publication Data

US 2016/0324022 A1 Nov. 3, 2016

Related U.S. Application Data

(60) Provisional application No. 62/153,983, filed on Apr. 28, 2015.

(51) Int. Cl.
| | | |
|---|---|---|
| A47B 81/00 | (2006.01) | |
| B29C 45/14 | (2006.01) | |
| G06F 1/16 | (2006.01) | |
| B29C 45/27 | (2006.01) | |
| B29C 45/44 | (2006.01) | |
| B29L 31/34 | (2006.01) | |
| B29C 45/33 | (2006.01) | |

(52) U.S. Cl.
CPC .... *B29C 45/14065* (2013.01); *B29C 45/2708* (2013.01); *B29C 45/44* (2013.01); *G06F 1/16* (2013.01); *B29C 45/33* (2013.01); *B29C 2045/14147* (2013.01); *B29L 2031/3481* (2013.01)

(58) Field of Classification Search
CPC ............ A47B 13/083; A47B 2013/085
USPC ................. 108/27; 312/140.4, 223.1, 223.2
See application file for complete search history.

(56) References Cited

U.S. PATENT DOCUMENTS

| | | | | |
|---|---|---|---|---|
| 2,646,327 A | * | 7/1953 | Saaf .................. | A47B 13/08 108/158 |
| 5,483,904 A | * | 1/1996 | Kelly .................. | A47B 13/08 108/156 |
| 6,378,831 B1 | * | 4/2002 | Copeland, Jr. ...... | A47B 13/083 108/27 |
| 7,499,270 B2 | * | 3/2009 | Allen .................. | E05B 73/0082 211/8 |

(Continued)

FOREIGN PATENT DOCUMENTS

| | | |
|---|---|---|
| JP | 2007-182057 A | 7/2007 |
| JP | 2009-259908 A | 11/2009 |
| JP | 2013-028159 A | 2/2013 |

*Primary Examiner* — Matthew W Ing
(74) *Attorney, Agent, or Firm* — Knobbe, Martens, Olson & Bear, LLP

(57) ABSTRACT

According to one embodiment, a housing includes a base plate and a frame formed on an outer edge of the base plate. The base plate includes a positioning hole for positioning in a mold. At least, the frame has a cross-section protruding outside the base plate. A positioning pin fit into the positioning hole is provided in the mold. An inlet through which molten resin is injected into a cavity of the mold is opened in the positioning pin. In the housing, the frame is formed on the outer edge of the base plate by injecting synthetic resin into the mold through the inlet.

9 Claims, 8 Drawing Sheets

(56) References Cited

U.S. PATENT DOCUMENTS

| | | | | |
|---|---|---|---|---|
| 8,422,215 | B2* | 4/2013 | Ou | G06F 1/1624 312/223.1 |
| 8,456,817 | B2* | 6/2013 | Tang | B23K 26/28 174/561 |
| 8,587,939 | B2* | 11/2013 | McClure | G06F 1/1626 312/223.1 |
| 2011/0285258 | A1* | 11/2011 | Yuan | G06F 1/1626 312/223.2 |

* cited by examiner

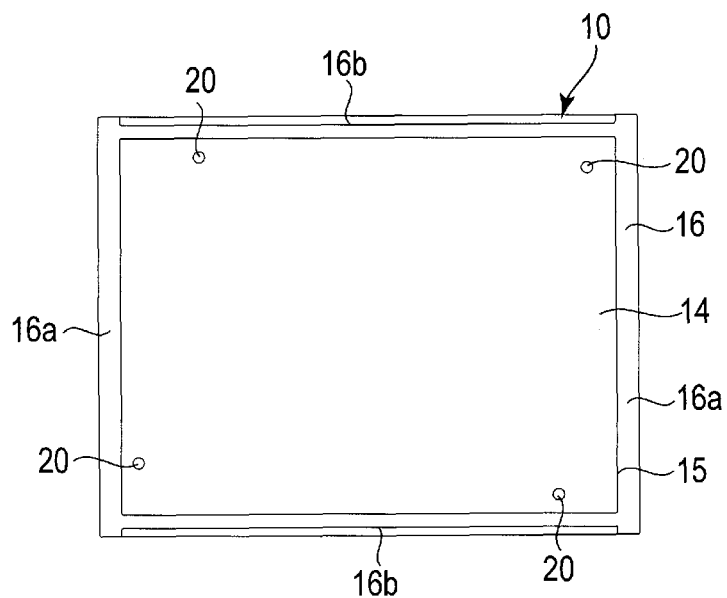
F I G. 4
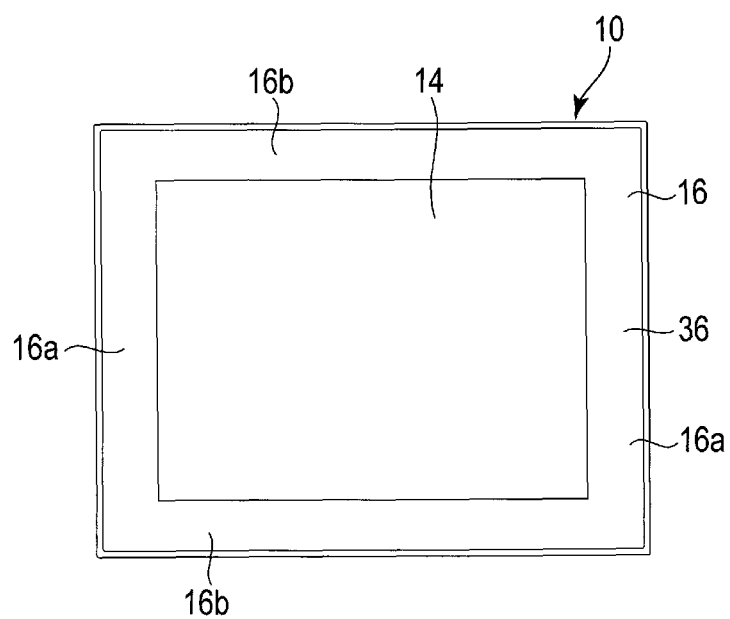
F I G. 5

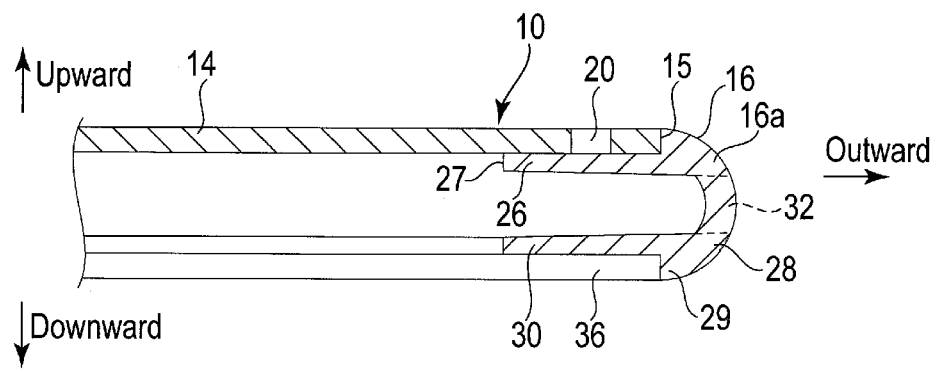
F I G. 6
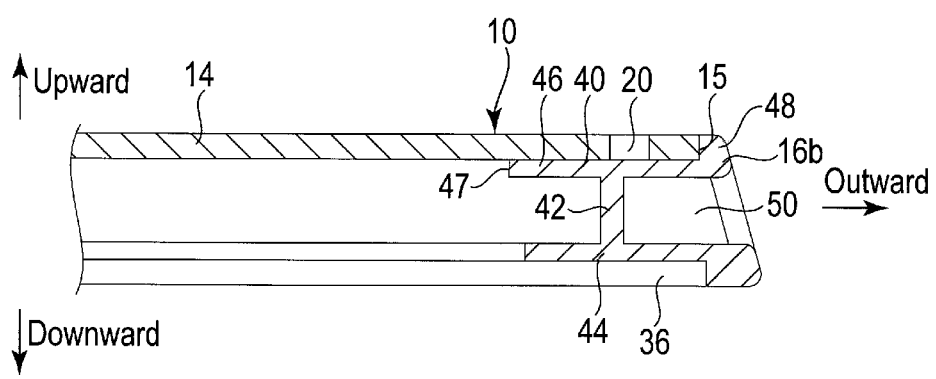
F I G. 7

HOUSING AND METHOD OF FORMING THE SAME

CROSS-REFERENCE TO RELATED APPLICATIONS

This application claims the benefit of U.S. Provisional Application No. 62/153,983, filed Apr. 28, 2015, the entire contents of which are incorporated herein by reference.

FIELD

Embodiments described herein relate generally to a housing formed by combining a base plate with synthetic resin and a method of forming the same.

BACKGROUND

Recently, a housing is often formed by using a carbon-fiber-reinforced resin base plate from the viewpoint of achieving weight and thickness reduction. However, it is difficult to provide a complex mechanical section such as ribs on the carbon-fiber-reinforced resin base plate and to form a high standing wall on the base plate. Therefore, a housing formed by performing outsert molding of a frame of synthetic resin around the carbon-fiber-reinforced resin base plate of a flat plate shape is known. In this case, from the viewpoint of improving stiffness of the housing, an area of use of the carbon-fiber-reinforced resin base plate should preferably be as large as possible.

In addition, from the viewpoint of improving the stiffness of the housing, a resin portion to be formed into the frame of the carbon-fiber-reinforced resin base plate should preferably have an incurved C-shaped cross-section. The frame portion having the C-shaped cross-section is formed by providing a mold with sliders that are moved along the carbon-fiber-reinforced resin base plate inside and outside the housing.

If the carbon-fiber-reinforced resin base plate is extended to the frame of the housing, however, edges of the sliders may correspond to the outer edge of the base plate. In this case, a place to provide an inlet through which molten resin is injected cannot be secured due to design.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is a plan view showing the housing of the embodiment.

FIG. 5 is a rear view showing the housing of the embodiment.

FIG. 6 is a cross-sectional view showing a frame portion of the housing of the embodiment.

FIG. 7 is a cross-sectional view showing another frame portion of the housing of the embodiment.

DETAILED DESCRIPTION

Various embodiments will be described hereinafter with reference to the accompanying drawings.

In general, according to one embodiment, a housing constitutes an electronic device and is obtained by: temporarily fixing an inlet, which is provided in a mold and is also used as a positioning pin, in a positioning hole provided on a base plate; injecting molten resin into the mold through the inlet; and forming, on an outer edge of the base plate, a frame having a C-shaped cross-section protruding outside the base plate.

Figure 1:
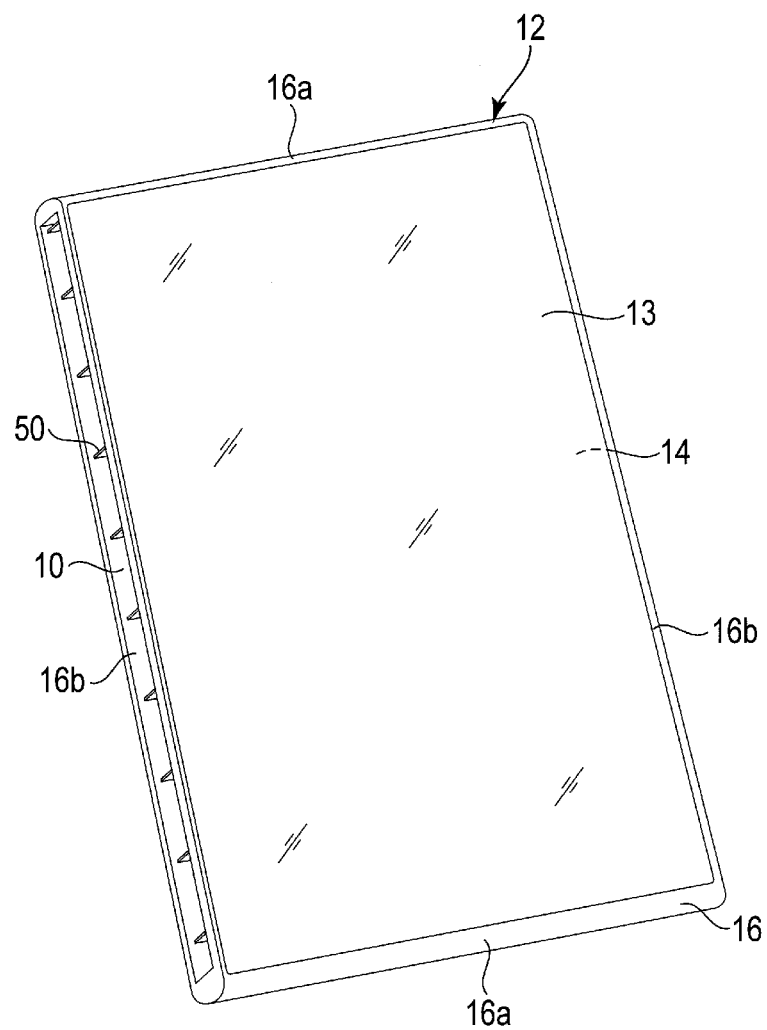
FIG. 1 is a perspective view showing an electronic device assembled by using a housing of an embodiment.

FIG. 1 is a perspective view showing a tablet 12 as an electronic device assembled by using a housing 10 of an embodiment. The tablet 12 is provided with a display surface 13 on the front and the housing 10 on the back.

Figure 2:
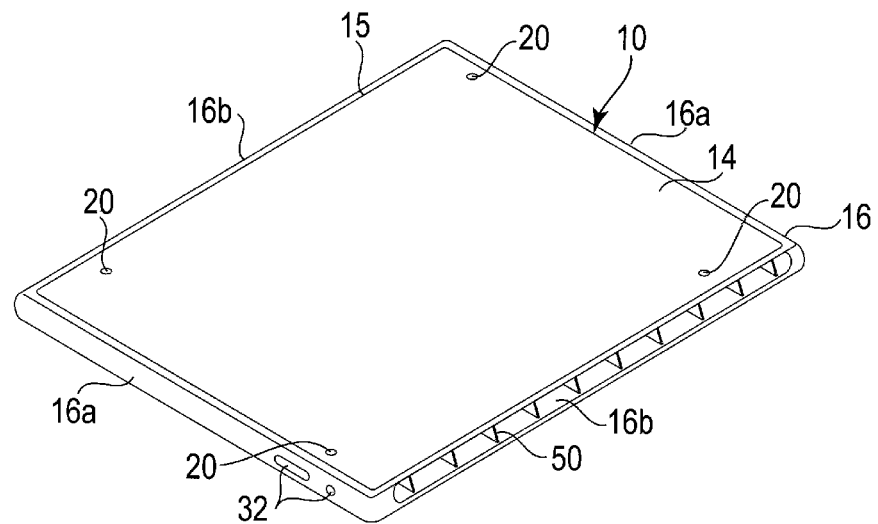
FIG. 2 is a perspective view showing the housing of the embodiment.
Figure 3:
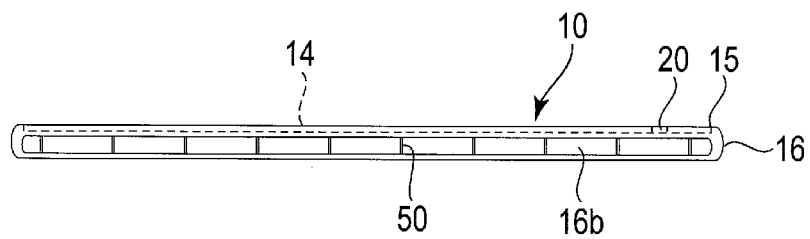
FIG. 3 is a side view showing the housing of the embodiment.

FIG. 2 is a perspective view obliquely showing the housing 10 from above. The housing 10 comprises a base plate 14 formed of a carbon-fiber-reinforced resin material and a frame 16 formed around the base plate 14 by injection molding. FIG. 3 is a side view showing a longitudinal side surface of the housing 10. FIG. 4 is a plan view showing the housing 10 from above. FIG. 5 is a bottom view showing the housing 10 from below. The housing 10 is hereinafter described on the assumption that a direction in which the frame 16 extends from the base plate 14 is downward and the opposite direction is upward.

The base plate 14 is a flat plate member formed by impregnating carbon fiber with resin and solidifying the resin. The base plate 14 is rectangular and is formed in a predetermined size. The base plate 14 has strength to provide the housing 10 with predetermined stiffness when the housing 10 is assembled, and has desired slimness and lightness. The frame 16 is provided on the outer edge of the base plate 14.

As shown in FIG. 2, the frame 16 is provided in the four sides of the base plate 14. The frame 16 is constituted by a pair of short-side frame portions 16a provided in the lateral direction of the base plate 14 and a pair of long-side frame portions 16b provided in the longitudinal direction of the base plate 14.

The short-side frame portions 16a are provided opposed to each other and have approximately the same shape. The long-side frame portions 16b are provided opposed to each other and have approximately the same shape. The opposing frame portions 16a and 16b of the frame 16 are hereinafter described.

FIG. 6 shows a cross-section of one of the short-side frame portions 16a. As shown in FIG. 6, the short-side frame portion 16a comprises an attachment portion 26 attached to the lower surface of the base plate 14, an arc portion 28 and an end portion 30. The short-side frame portion 16a has a shape protruding like an arc in a direction away from an edge 15 of the base plate 14 (hereinafter referred to as outward). The short-side frame portion 16a has a thin plate shape. An inner side (i.e., a side facing the center of the base plate 14) of the short-side frame portion 16a has an indented shape.

The attachment portion 26 corresponds to a first portion in the claims. The attachment portion 26 has a thin plate shape and is in close contact with the lower surface of the base plate 14. The attachment portion 26 has a predetermined breadth from the edge 15 of the base plate 14 to the center side of the base plate 14. The attachment portion 26 is provided along the edge 15 of the base plate 14. An upper surface of the attachment portion 26 is on the same plane with an upper surface of the base plate 14. The arc portion 28 is provided at an end of the attachment portion 26.

The arc portion 28 corresponds to a second portion in the claims. The arc portion 28 is provided continuous with the attachment portion 26. The arc portion 28 has a substantially semicircular cross-section and is curved almost without straight portion from the edge 15 of the base plate 14.

A through-hole 32 is provided in an outer part of the arc portion 28. The through-hole 32 is, for example, a hole through which various plugs are inserted, a hole through which a storage medium or the like is inserted, etc. Stiffening ribs or the like are arbitrary provided on the inner surface of the arc portion 28. The arc portion 28 is coupled with the end portion 30 on the opposite side of the attachment portion 26. Since the arc portion 28 is semicircular, boundaries of the arc portion 28 with the attachment portion 26 and the end portion 30 are indistinct.

The end portion 30 corresponds to a third portion in the claims. The end portion 30 is provided continuous with a lower end 29 of the arc portion 28. The end portion 30 has a step 36 indented from the outer surface of the arc portion 28 to the side of the base plate 14. The end portion 30 extends approximately parallel to the base plate 14 in a predetermined length from the lower end 29 of the arc portion 28 to the center side of the base plate 14. A draft angle for extracting a mold is provided between the attachment portion 26 and the end portion 30.

FIG. 7 shows a cross-section of one of the long-side frame portions 16b. As shown in FIG. 7, the long-side frame portion 16b comprises a first portion 40, a second portion 42 and a third portion 44. The first portion 40 comprises an attachment portion 46 and an extending portion 48. The attachment portion 46 is in close contact with the lower surface of the base plate 14. The attachment portion 46 has a predetermined breadth from the edge 15 of the base plate 14 to the center side of the base plate 14. The attachment portion 46 is provided along the edge 15 of the base plate 14.

The extending portion 48 is provided continuous with the attachment portion 46. The extending portion 48 protrudes from the edge 15 of the base plate 14 in a predetermined length. The extending portion 48 is in close contact with the edge 15 of the base plate 14 and covers the edge 15. The outer surface (upper surface) of the extending portion 48 is on the same plane with the upper surface of the base plate 14.

The second portion 42 is provided such that the upper end of the second portion 42 is coupled with the lower surface of the first portion 40. The second portion 42 is approximately orthogonal to the first portion 40 and extends on the side of the lower surface of the base plate 14. The second portion 42 is provided along the edge 15 of the base plate 14. The third portion 44 is provided at the lower end of the second portion 42.

The third portion 44 is provided continuous with the lower end of the second portion 42. The third portion 44 extends approximately parallel to the first portion 40. The third portion 44 has a step 36 on the lower surface.

Ribs 50 extending outward from the second portion 42 are provided between the first portion 40 and the third portion 44. The ribs 50 are provided in a longitudinal direction of the long-side frame portion 16b at predetermined intervals. A draft angle for extracting the mold is provided on both sides of the second portion 42 between the first portion 40 and the third portion 44.

As also shown in FIG. 2, a positioning hole 20 is provided near each portion of the frame 16 on the periphery of the edge 15 of the base plate 14. That is, a total of four positioning holes 20 are provided. The positioning holes 20 are provided in positions corresponding to pin gate bushes 52 provided in a mold 22. The positioning holes 20 have an inside diameter equal to the diameter of positioning pins 24 provided in the pin gate bush 52.

The positioning holes 20 provided near the short sides of the base plate 14 are each provided in a region between the edge 15 of the base plate 14 and an edge 27 of the attachment portion 26 of the short-side frame portion 16a on the center side of the base plate 14. The positioning holes 20 provided near the long sides of the base plate 14 are each provided in a region between the edge 15 of the base plate 14 and an edge 47 of the attachment portion 46 of the long-side frame portion 16b on the center side of the base plate 14.

Next, a mold 22 which forms the housing 10 and a method of forming the housing 10 by means of the mold 22 are described.

Figure 8:
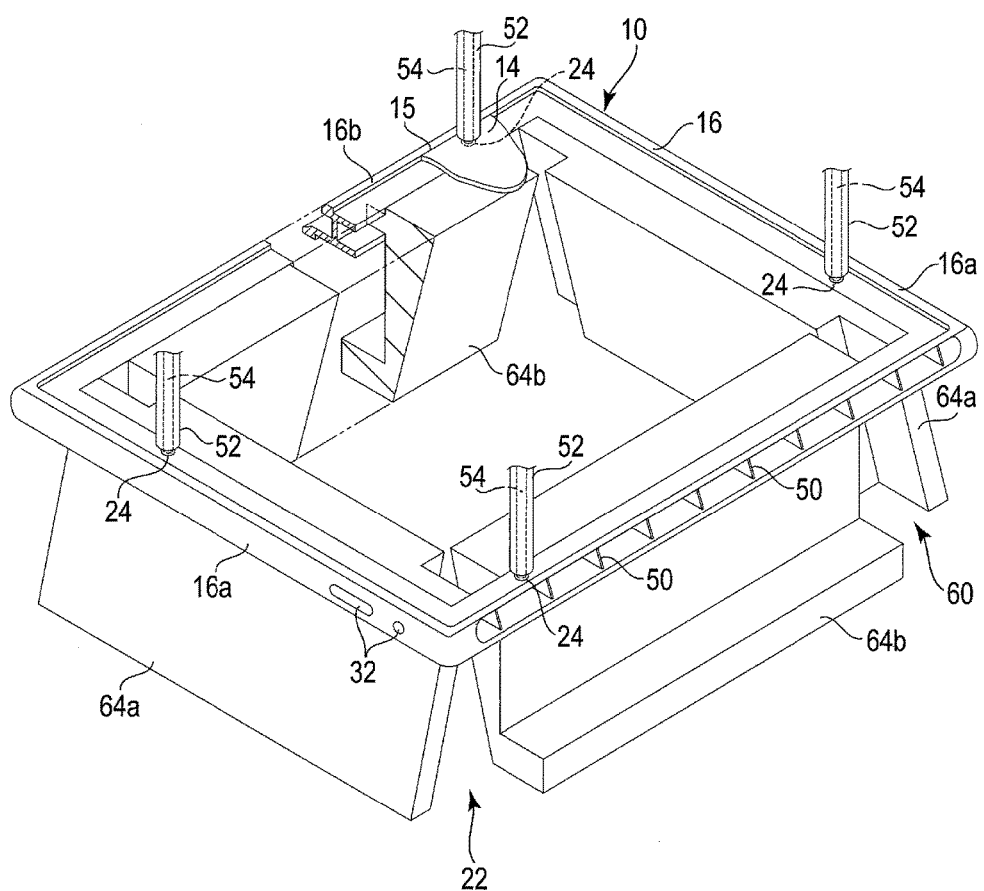
FIG. 8 is a perspective view showing an example of a mold for forming the housing of the embodiment.
Figure 9:
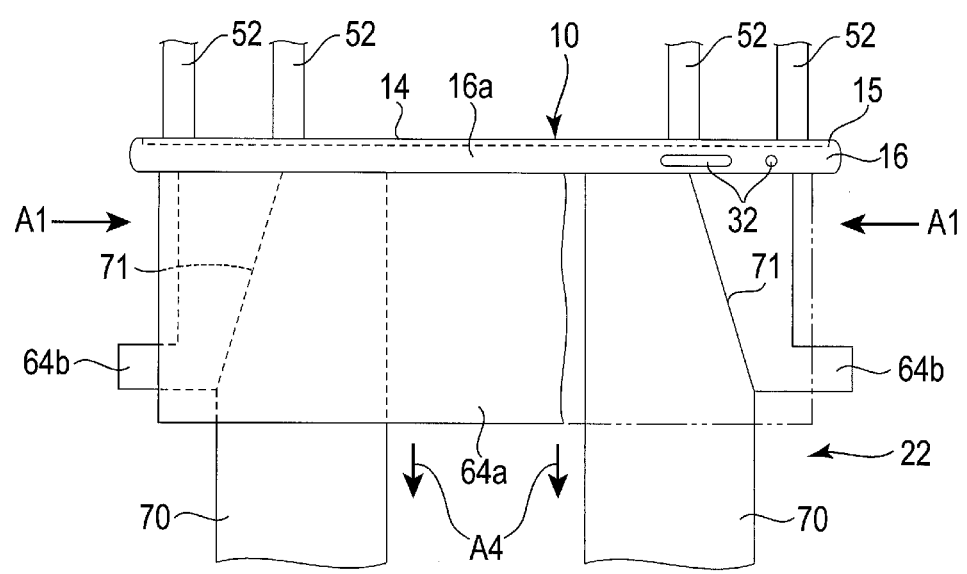
FIG. 9 is a side view showing an example of the mold for forming the housing of the embodiment.

The mold 22 comprises a fixed mold and a movable mold opposed to the fixed mold. The housing 10 and the mold 22 are shown in FIG. 8 and FIG. 9. In FIG. 8 and FIG. 9, the fixed mold is located above and the movable mold is located below with the base plate 14 between. FIG. 8 shows a slider 60 alone of the mold 22. In FIG. 8, the housing 10 is shown with the base plate 14 partially cut away. The pin gate bushes 52 are provided in the fixed mold.

Figure 10:
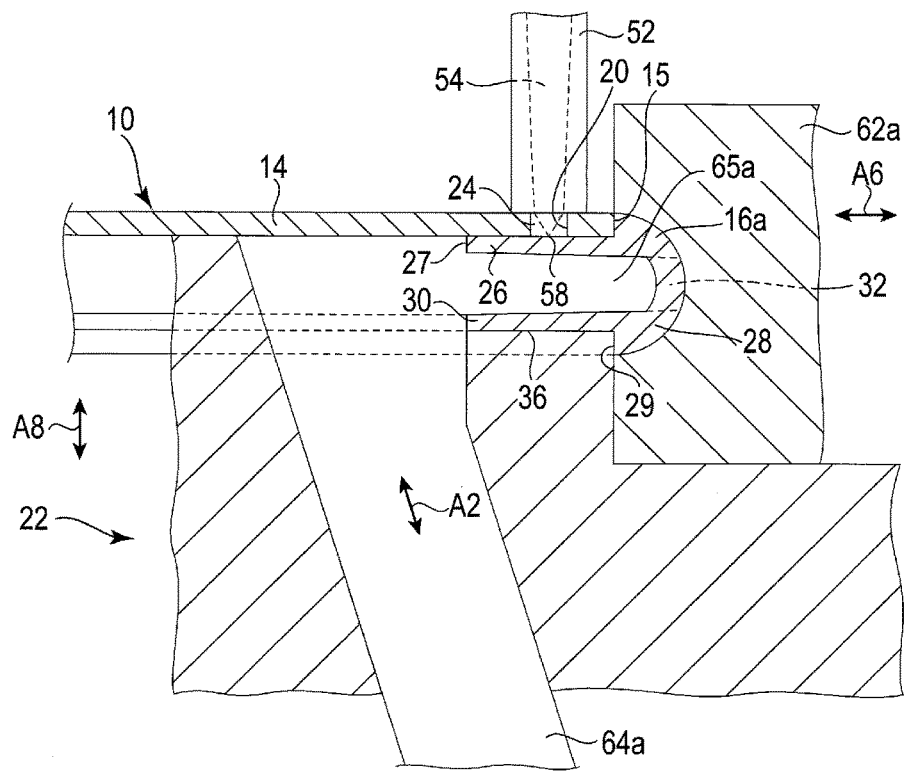
FIG. 10 is a cross-sectional view showing the frame portion of the housing of the embodiment with the mold.

As shown in FIG. 8, a positioning pin 24 is formed at the end of each pin gate bush 52 as described above. A resin passage 54 is formed inside each pin gate bush 52. As shown in FIG. 10, each resin passage 54 continues to an inlet 58 opened at the end of the positioning pin 24. The posterior end of each resin passage 54 is connected to a nozzle of an injection mechanism. The injection mechanism melts a resin pellet by heat, extrudes the molten resin from the nozzle with a predetermined pressure and injects the molten resin into the mold 22 through the inlet 58.

The movable mold is attached to the mold clamping mechanism. The movable mold is provided so as to move toward and away from the fixed mold by drive of the mold clamping mechanism.

The slider 60 comprises an outer surface slider 62 which forms the outer surface of the frame 16 of the housing 10 and an inner surface slider 64 which forms the inner surface of the frame 16. The outer surface slider 62 and the inner surface slider 64 are basically provided to move in a direction orthogonal to the moving direction of the movable mold.

The outer surface slider 62 is hereinafter described. The outer surface slider 62 comprises outer surface sliders 62a for the short-side frame portions 16a shown in FIG. 10 and outer surface sliders 62b for the long-side frame portions 16b shown in FIG. 11. Outer surface sliders 62a and 62b are provided so as to reciprocate in directions vertical to the moving direction (arrow A8) of the movable mold, as indicated by arrow A6 in FIG. 10 and arrow A7 in FIG. 11.

Outer surface sliders 62a for the short-side frame portions 16a are each formed in a shape corresponding to the outer surface of the short-side frame portion 16a. Outer surface sliders 62b for the long-side frame portions 16b are each formed in a shape corresponding to the outer surface of the long-side frame portion 16b. When the mold is clamped, outer surface sliders 62a for the short-side frame portions 16a and outer surface sliders 62b for the long-side frame portions 16b are moved to a position of the edge 15 of the base plate 14 attached to the mold 22.

Figure 11:
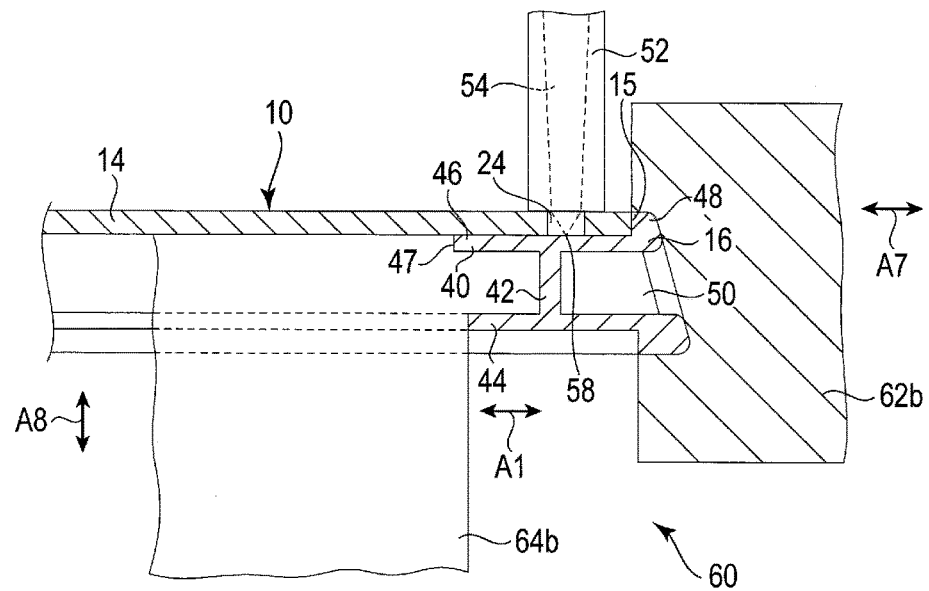
FIG. 11 is a cross-sectional view showing the other frame portion of the housing of the embodiment with the mold.

The inner surface slider 64 comprises inner surface sliders 64a for the short-side frame portions 16a shown in FIG. 10 and inner surface sliders 64b for the long-side frame portions 16b shown in FIG. 11. As shown in FIG. 11, inner surface sliders 64b for the long-side frame portions 16b are provided so as to move in a direction (A1) vertical to the moving direction (A8) of the movable mold. As shown in FIG. 9, inner surface sliders 64b are moved toward the outside of the housing 10 by the press of sloping surfaces 71 of slide members 70.

As shown in FIG. 10, inner surface sliders 64a for the short-side frame portions 16a are provided so as to reciprocate in a direction (A2) obliquely intersecting the moving direction (A8) of the movable mold. A cavity forming portion 65a which forms the short-side frame portion 16a is moved in a direction (A3 in FIG. 12) vertical to the moving direction (A8) of the movable mold by moving inner surface slider 64a obliquely with respect to the moving direction (A8) of the movable mold.

When the mold 22 is clamped by the mold clamping mechanism, the movable mold, the outer surface slider 62 and the inner surface slider 64 are moved in the vertical and horizontal directions to form a space (cavity) for forming the frame 16 around the base plate 14.

The pin gate bushes 52 having the positioning pins 24 are provided in the fixed mold. The positioning pins 24 are each provided at the end of the pin gate bush 52 to protrude from a cavity forming surface of the fixed mold in a length equal to the thickness of the base plate 14. The positioning pins 24 are provided in the fixed mold to correspond to the positioning holes 20 of the base plate 14, respectively.

Next, a method of forming the housing 10 by means of the mold 22 is described. The base plate 14 is attached to the fixed mold of the opened mold 22. The base plate 14 is temporarily fixed in a predetermined position in the fixed mold by inserting the positioning pins 24 into the positioning holes 20.

The mold 22 is clamped by driving the mold clamping mechanism. When the mold 22 is clamped, the fixed mold and the movable mold are closed and the slider 60 is moved to a predetermined position. The cavity is thereby formed inside the mold 22.

The molten resin is injected into the mold 22 by actuating the injection mechanism. The molten resin is injected from the nozzle into the cavity through the resin passages 54 and the inlets 58. Since the inlets 58 communicate with the inside of the cavity through the positioning holes 20 of the base plate 14, the cavity is filled with the molten resin through the inlets 58.

When the resin filling the cavity is solidified, the mold clamping mechanism is actuated in a direction in which the mold 22 is opened. When the mold clamping mechanism is actuated, the movable mold is moved away, the slider 60 is moved and the mold 22 is thereby opened.

Figure 13:
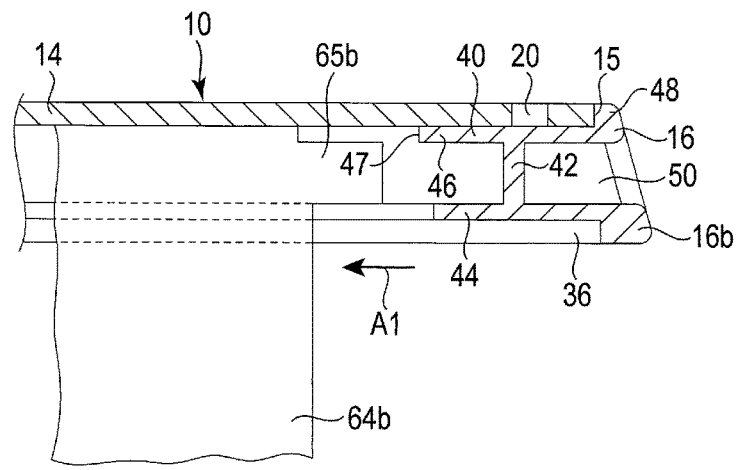
FIG. 13 is a cross-sectional view showing the other frame portion of the housing of the embodiment with the moved mold.

In the slider 60, outer surface sliders 62a and 62b of the outer surface slider 62 are moved outside the base plate 14 along arrows A6 and A7, respectively, and thereby moved away from the frame 16. Inner surface sliders 64b are moved to the center side of the base plate 14 along arrows A1 by moving the slide members 70 away along arrows A4 as shown in FIG. 9, and cavity forming members 65b are thereby moved away from the frame 16 as shown in FIG. 13.

Figure 12:
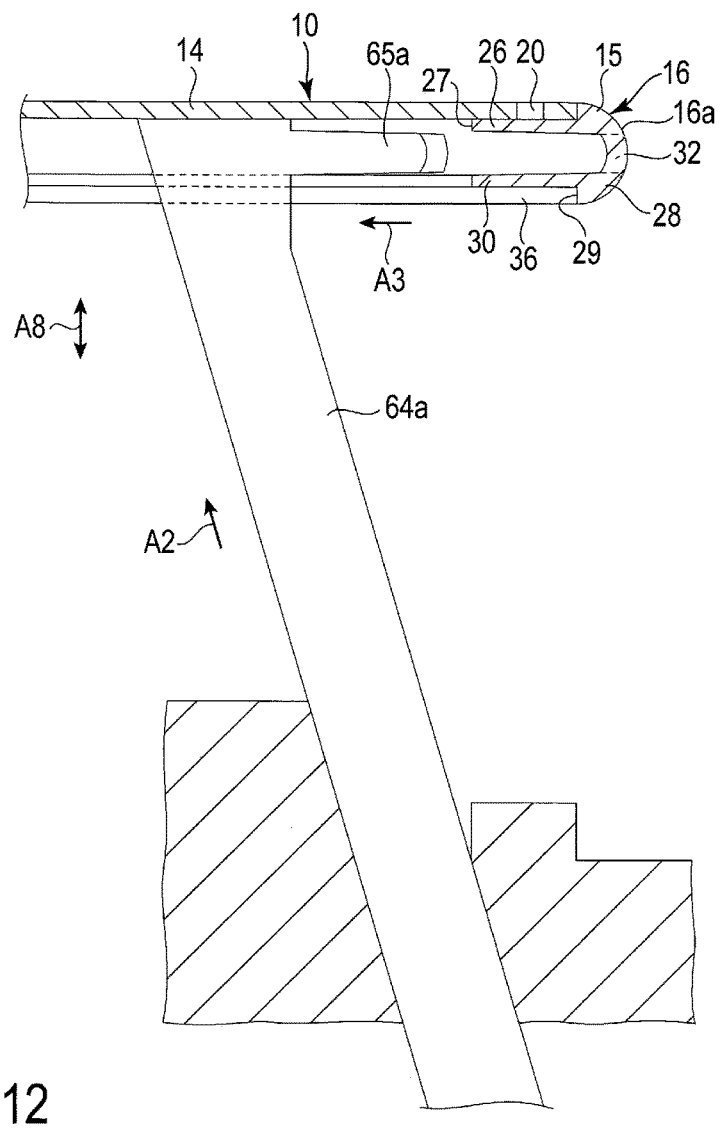
FIG. 12 is a cross-sectional view showing the frame portion of the housing of the embodiment with the moved mold.

As shown in FIG. 12, inner surface sliders 64a of the inner surface slider 64 are moved along arrow A2 obliquely upward from the movable mold. Along with the obliquely upward movement of inner surface sliders 64a with respect to the movable mold, the cavity forming portions 65b of inner surface sliders 64a are moved to the center side of the base plate 14 along arrow A3 away from the frame 16.

In this way, the frame 16 is provided around the base plate 14 and the housing 10 is formed. Since the positioning pins 24 of the mold 22 are fit into the positioning holes 20 of the base plate 14, the housing 10 is extracted from the mold 22 by removing the base plate 14 from the positioning pins 24. Traces of the positioning pins 24 formed on the base plate 14 are filled with resin, etc., as appropriate.

As describe above, according to the present embodiment, the inlets 58 of the mold 22 are provided in the positioning pins 24, penetrate the base plate 14 and are opened inside the cavity of the mold 22. Therefore, the frame 16 can be formed around the base plate 14 by injecting the molten resin into the cavity through the positioning pins 24, even if the fixed mold does not have any portion communicating with the cavity.

According to the present embodiment, the base plate 14 extends proximally to the frame 16. Therefore, the housing 10 having high stiffness can be provided. According to the present embodiment, the frame 16 is formed to have a C-shaped cross-section. Therefore, flexibility of the base plate 14 can be reduced and the housing 10 having high stiffness can be provided. The attachment position of the base plate 14 in the mold 22 can be accurately set by the positioning pins 24. The traces of the positioning pins 24 left on the base plate 14 after forming the housing 10 can be removed in appearance by, for example, filling the positioning holes 20 with resin, etc., and coating the holes after molding the housing 10.

The shape of the frame 16 is not limited to the shape described above. The shape, the material and the like of the base plate 14 are not limited to the above embodiment. The mold 22 is not limited to the above embodiment either.

The electronic device such as a liquid crystal tablet having high stiffness can be provided by incorporating an image display device such as a liquid crystal panel into the housing 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic housing comprising:
 a base plate; and
 a frame on an outer edge of the base plate and comprising a synthetic resin material, wherein:
 the base plate comprising a positioning hole to be engaged with a positioning pin in a mold for forming the electronic housing;

the frame comprising:
a first portion on the outer edge of the base plate;
a third portion at a first interval from the first portion; and
a second portion between the first portion and the third portion, coupling the first portion and the third portion, and forming the frame to have a thin cross-section protruding outside the base plate;
the positioning hole being an inlet injecting the synthetic resin material; and
the frame formed by injecting the synthetic resin material into a cavity formed inside the mold through the positioning hole.

2. The electronic housing of claim 1, wherein
an upper surface of the first portion is on the same plane with a first surface of the base plate,
a lower surface of the first portion is attached to a second surface of the base plate opposite to the first surface, and
the third portion is on a side of the second surface at the first interval from the first portion.

3. The electronic housing of claim 1, wherein
the cross-section of the frame is C-shaped.

4. The electronic housing of claim 1, wherein
the second portion is at a midpoint of an outward direction of the first portion and the third portion extending in a direction orthogonal to the first portion and the third portion.

5. The electronic housing of claim 1, wherein
the base plate is a plate material formed by impregnating carbon fiber with resin.

6. The electronic housing of claim 2, wherein
the cross-section of the frame is C-shaped.

7. The electronic housing of claim 2, wherein
the second portion is at a midpoint of an outward direction of the first portion and the third portion extending in a direction orthogonal to the first portion and the third portion.

8. The electronic housing of claim 2, wherein
the base plate is a plate material formed by impregnating carbon fiber with resin.

9. The electronic housing of claim 4, wherein
a rib extending outward from the base plate is between the first portion and the third portion.

* * * * *